(12) United States Patent
Marchand

(10) Patent No.: US 9,341,288 B2
(45) Date of Patent: May 17, 2016

(54) FLEXIBLE PIPE FOR CONVEYING HYDROCARBONS HAVING A HIGH CORROSION RESISTANCE, AND METHOD FOR MAKING SAME

(75) Inventor: Didier Marchand, Saint Etienne du Rouvray (FR)

(73) Assignee: TECHNIP FRANCE (FR)

( * ) Notice: Subject to any disclaimer, the term of this patent is extended or adjusted under 35 U.S.C. 154(b) by 1079 days.

(21) Appl. No.: 13/055,963

(22) PCT Filed: Jul. 27, 2009

(86) PCT No.: PCT/FR2009/000930
§ 371 (c)(1),
(2), (4) Date: Mar. 16, 2011

(87) PCT Pub. No.: WO2010/012896
PCT Pub. Date: Feb. 4, 2010

(65) Prior Publication Data
US 2011/0162750 A1    Jul. 7, 2011

(30) Foreign Application Priority Data
Jul. 28, 2008  (FR) ...................................... 08 04292

(51) Int. Cl.
*F16L 11/00* (2006.01)
*F16L 9/14* (2006.01)
(Continued)

(52) U.S. Cl.
CPC ................. *F16L 11/083* (2013.01); *C21D 9/08* (2013.01); *C21D 9/46* (2013.01); *C21D 9/52* (2013.01);
(Continued)

(58) Field of Classification Search
CPC ........ C22C 38/44; F16L 11/083; F16L 11/16; F16L 58/08

USPC ......... 138/129, 131–135, 137–137, 140, 150, 138/153, 154
See application file for complete search history.

(56) References Cited

U.S. PATENT DOCUMENTS 3,736,131 A    5/1973  Espy
6,401,760 B2 *  6/2002  Espinasse .................... 138/135
(Continued)

FOREIGN PATENT DOCUMENTS

FR    2119612 A    8/1972
FR    2654795      5/1991
(Continued)

OTHER PUBLICATIONS

ThyssenKrupp, Nicrofer 3127 hMo—alloy 31 Material Data Sheet No. 4031, ThyssenKrupp VDM, Jun. 2006, Accessed Apr. 9, 2014 at <http://www.thyssenkrupp-vdm.com/fileadmin/Downloads/Datenblaetter/en/Nicrofer3127hMo_e.pdf>.*
(Continued)

*Primary Examiner* — Patrick F Brinson
*Assistant Examiner* — Matthew Lembo
(74) *Attorney, Agent, or Firm* — Ostrolenk Faber LLP

(57) ABSTRACT

A flexible tubular duct for conveying corrosive fluids and used in the filed of petroleum extraction at sea. A flexible tubular duct includes at least one inner carcass (2) and a polymer sealing sheath (3). The inner carcass has a reinforcement metal profile (7) that is helically wound. The reinforcement metal profile (7) is made of an alloy having the following weight composition: 30 to 32% of Ni; 26 to 28% of Cr; 6 to 7% of Mo; 0.10 to 0.3% of N; 0.015% of C; 2% at most of Mn; 0.5 to 1.5% of Cu; 0.5% at most of impurities, the remainder consisting of Fe.

7 Claims, 2 Drawing Sheets

Figure 1:
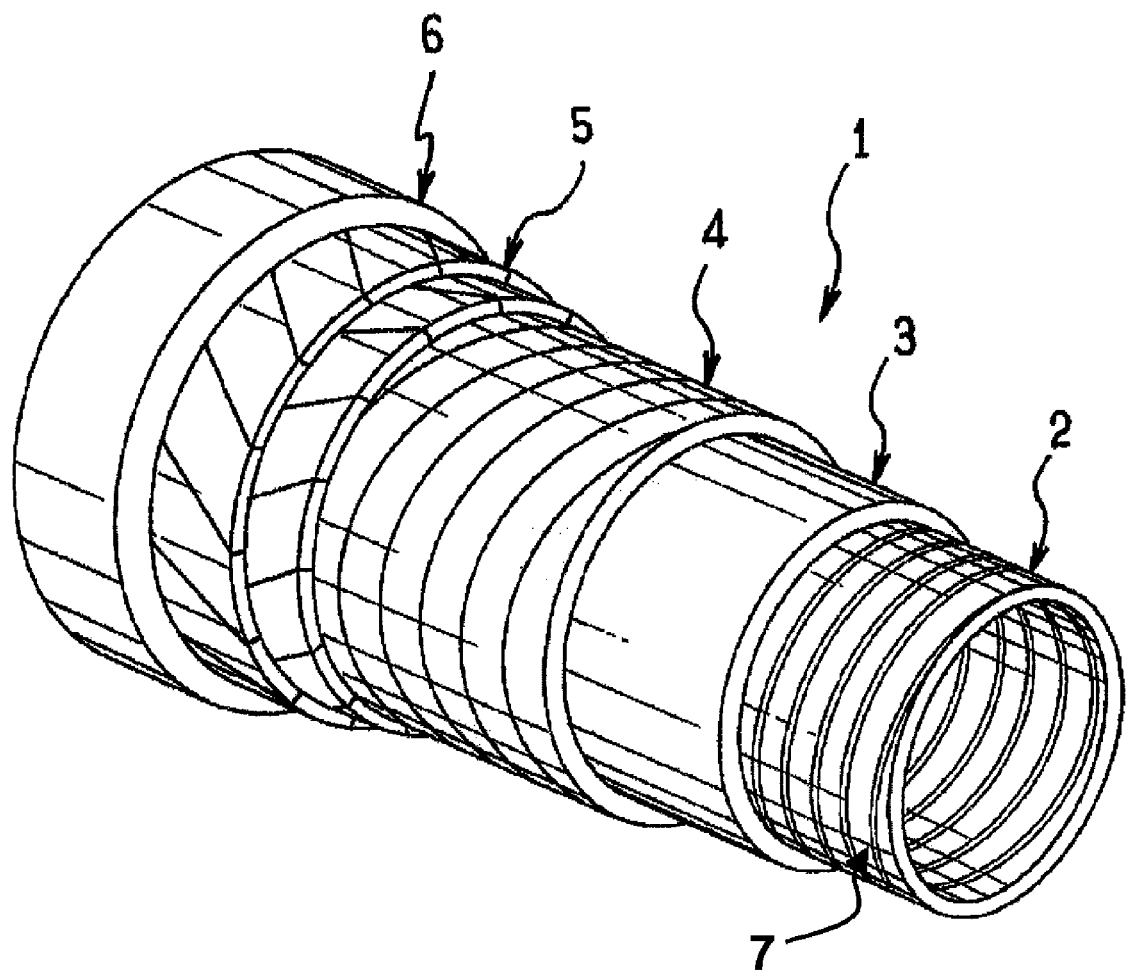

(51) Int. Cl.
  *F16L 11/08* (2006.01)
  *C21D 9/08* (2006.01)
  *C21D 9/46* (2006.01)
  *C21D 9/52* (2006.01)
  *C22C 38/00* (2006.01)
  *C22C 38/42* (2006.01)
  *C22C 38/44* (2006.01)
  *F16L 11/16* (2006.01)
  *F16L 58/08* (2006.01)
  *F16L 58/16* (2006.01)

(52) U.S. Cl.
  CPC .............. *C22C 38/001* (2013.01); *C22C 38/42* (2013.01); *C22C 38/44* (2013.01); *F16L 11/16* (2013.01); *F16L 58/08* (2013.01); *F16L 58/16* (2013.01)

(56) References Cited

U.S. PATENT DOCUMENTS 6,904,939 B2 * 6/2005 Jung et al. .................... 138/135
6,978,806 B2 * 12/2005 Glejbol et al. ................ 138/134

FOREIGN PATENT DOCUMENTS

| FR | 2772293 | 6/1999 |
|---|---|---|
| WO | WO 00/00650 | 1/2000 |
| WO | WO 01/44531 A | 6/2001 |
| WO | WO 02/27056 A | 4/2002 |
| WO | WO 03/036152 | 5/2003 |
| WO | WO 2006/097112 A | 9/2006 |

OTHER PUBLICATIONS

Kloewer et al., Corrosion 2001: H2S Resistant Materials for Oil & Gas Production, NACE International, 2001, Accessed Apr. 10, 2014 at <http://ipm.lviv.ua/library/0/54/004.PDF>.*

NACE International, Standard Material Requirements: Sulfide Stress Cracking Resistant Metallic Materials for Oilfield Equipment, NACE Standard MR0175-2002 Item No. 21304, NACE International, 2002, p. 16.*

Specification for Unbonded Flexible Pipe, Upstream Segment, API Specification 17J, Second Edition, Nov. 1999, Effective Date: Jul. 1, 2000, American Petroleum Institute.

Recommended Practice for Flexible Pipe, API Recommended Practice 17B, Third Edition, Mar. 2002, American Petroleum Institute.

International Search Report dated Nov. 11, 2009, issued in corresponding international application No. PCT/FR2009/000930.

* cited by examiner

FLEXIBLE PIPE FOR CONVEYING HYDROCARBONS HAVING A HIGH CORROSION RESISTANCE, AND METHOD FOR MAKING SAME

CROSS-REFERENCE TO RELATED APPLICATIONS

The present application is a 35 U.S.C. §§ 371 national phase conversion of PCT/FR2009/000930filed Jul. 27, 2009, which claims priority of French Application No. 0804292, filed Jul. 28, 2008, the contents of which are incorporated by reference herein. The PCT International Application was published in the French language.

BACKGROUND OF THE INVENTION

The present invention relates to a flexible tubular pipe for transporting fluids that is used in the offshore oil production field. It relates more particularly to a flexible pippe comprising an internal carcass with high corrosion resistance, and to the manufacturing process thereof.

The flexible pipes targeted by the present invention are formed from an assembly of various concentric and superposed layers, and are said to be of the unbonded type since these layers have a certain freedom to move relative to one another. These flexible pipes comply with, among others, the recommendations of the normative documents API 17J "Specification for Unbonded Flexible Pipe" and API RP 17B "Recommended Practice for Flexible Pipe" published by the American Petroleum Institute. The constituent layers comprise, in particular, polymeric sheaths that generally provide a sealing function, and reinforcing layers intended to take up the mechanical forces and that are formed by windings of metal wires or strips or various tapes or sections made of composites.

Unbonded flexible pipes used most often in the offshore oil industry generally comprise, from the inside outward, an internal carcass consisting of a profiled stainless steel strip that is wound helically in a short pitch into turns that are interlocked with one another, said internal carcass mainly serving to prevent the pipe from collapsing under the effect of the external pressure, a polymeric internal sealing sheath, a pressure vault consisting of at least one interlocking metal wire wound helically in a short pitch, said pressure vault serving to take up the radial forces associated with the internal pressure, tensile armor layers formed by long-pitch helical windings of metal or composite wires, said armor layers being intended to take up the longitudinal forces undergone by the pipe, and finally an external sheath intended to protect the reinforcing layers from seawater. In the present application, the expression "short-pitch winding" is understood to mean any winding having a helix angle for which the absolute value is close to 90°, in practice between 70° and 90°. The expression "long-pitch winding" itself denotes any winding for which the helix angle is less than or equal, as an absolute value, to 55°.

A flexible pipe comprising an internal carcass is referred to as a rough-bore pipe since the innermost element is the internal carcass that forms a rough bore owing to gaps between the metal turns of the interlocked metal strip.

The internal carcass is in direct contact with the fluid flowing in the pipe. However, the hydrocarbons extracted from certain oil fields may be extremely corrosive. This is the case, in particular, for multiphase hydrocarbons comprising high partial pressures of hydrogen sulfide ($H_2S$), typically at least 2 bar, and/or of carbon dioxide ($CO_2$), typically at least 5 bar, and that also have a high concentration of chlorides, typically at least 50 000 ppm. Such fluids are generally highly acidic (pH<4.5). In addition, their temperature may exceed 90° C. Under these very harsh conditions, the internal carcass must be able to maintain its integrity over a service life of at least 20 years.

Furthermore, the flexible pipe must have a collapse resistance that is sufficient to enable it to withstand high external pressures, especially hydrostatic pressure when the pipe is submerged at great depth (1000 m or even 2000 m or more), or else the external contact pressures experienced during offshore laying and handling operations. Furthermore, it is desirable to limit the weight of the flexible pipe, and therefore in particular that of the internal carcass, especially for applications at great depth. This weight reduction makes it possible, among other things, to facilitate offshore laying, to achieve greater water depths and to reduce the manufacturing and laying costs. However, the collapse resistance of the internal carcass is an increasing function of the yield stress of the profiled strip of which it is constituted. This is why it is advantageous to seek to increase the yield stress of this strip, while making sure, however, that the corrosion resistance remains satisfactory.

Application WO 00/00650 and the normative document API RP 17B disclose flexible pipes for which the internal carcass is made of austenitic stainless steel, especially the grades AISI 304 (UNS S30400), AISI 304L (UNS S30403), AISI 316 (UNS S31600) and AISI 316L (UNS S31603). They also disclose solutions in which the internal carcass is made of duplex steel, especially the grade 2205 (UNS S31803), or else a nickel-based alloy, especially the alloy 825 (UNS N08825).

Moreover, application WO 2006/097112 discloses flexible pipes for which the internal carcass is made of nickel-depleted duplex steel ("lean duplex") especially the grade 2101 (UNS S32101).

However, these solutions from the prior art are not satisfactory. Indeed, internal carcasses made of austenitic steel or of duplex steel are not sufficiently resistant to the very corrosive media described above. Those made of a nickel-based alloy are themselves afflicted by mechanical properties that are too low and are moreover very expensive.

SUMMARY OF THE INVENTION

One problem that the present invention faces and aims to solve is therefore to develop a flexible pipe comprising an internal carcass that can withstand highly corrosive media, having, in addition, a high collapse resistance, and that can finally be manufactured and laid at an advantageous cost.

For this purpose, and according to a first aspect, the present invention proposes a flexible tubular pipe for transporting fluids in the offshore oil production field, said flexible tubular pipe comprising at least one internal carcass and a polymeric sealing sheath, said internal carcass comprising a helically-wound reinforcing metal profile; moreover, said pipe is characterized in that said reinforcing metal profile is made from a corrosion-resistant alloy of composition:

30 to 32% by weight of nickel (Ni),
26 to 28% by weight of chromium (Cr),
6 to 7% by weight of molybdenum (Mo),
0.10 to 0.3% by weight of nitrogen (N),
at most 0.015% by weight of carbon (C),
at most 2% by weight of manganese (Mn),
0.5 to 1.5% by weight of copper (Cu),
at most 0.5% by weight of impurities,
the remainder of the composition being constituted of iron (Fe).

Moreover, advantageously, said corrosion-resistant alloy is UNS N08031.

According to a first embodiment of the invention, said reinforcing metal profile is a wire of drawn or rolled form. According to another embodiment of the invention, said reinforcing metal profile is a profiled strip. Furthermore, said reinforcing metal profile is preferably interlocked.

Moreover, advantageously, the yield stress of said reinforcing metal profile is greater than 800 MPa. In addition, said reinforcing metal profile preferably comprises zones having a hardness of greater than 40 HRc.

In the present application, unless otherwise indicated, the yield stresses are measured at an elongation threshold of 1% (Rp 1).

According to a second aspect, the invention proposes a process for manufacturing a flexible tubular pipe for transporting fluids in the offshore oil production field, said flexible tubular pipe comprising at least one internal carcass and a polymeric sealing sheath, said manufacturing process being of the type according to which a crude metal profile of long length is provided; said crude metal profile is helically wound in order to form a reinforcing metal profile, said reinforcing metal profile being a component of the internal carcass; a polymeric sealing sheath (3) is extruded around said internal carcass; moreover, said manufacturing process is characterized in that said crude metal profile is made from a corrosion-resistant alloy of composition:

30 to 32% by weight of nickel (Ni),
26 to 28% by weight of chromium (Cr),
6 to 7% by weight of molybdenum (Mo),
0.10 to 0.3% by weight of nitrogen (N),
at most 0.015% by weight of carbon (C),
at most 2% by weight of manganese (Mn),
0.5 to 1.5% by weight of copper (Cu),
at most 0.5% by weight of impurities,
the remainder of the composition being constituted of iron (Fe).

Furthermore, advantageously, said corrosion-resistant alloy is UNS N08031.

According to a first embodiment of the invention, said crude metal profile is a wire of drawn or rolled form. According to another embodiment, said crude metal profile is a strip. In this case, advantageously, said crude metal profile is transformed by profiling before being helically wound. Furthermore, said crude metal profile is preferably interlocked during the helical winding step.

Moreover, advantageously, the work-hardening applied to said crude metal profile in order to transform it to said reinforcing metal profile is applied at ambient temperature, which has the effect of raising the yield stress of the material. Furthermore, the yield stress of said reinforcing metal profile is preferably greater than 800 MPa. Moreover, advantageously, the yield stress of said crude metal profile is between 300 MPa and 400 MPa before work-hardening.

Thus, it has been discovered that, surprisingly, the alloys having the composition defined above hold out remarkably well in the aforementioned highly corrosive media, while having a high yield stress. Furthermore, this invention goes against the recommendations of the standards API RP 17B and NACE MR 0175/ISO 15156, which, in the same situation, recommend using a nickel-based alloy typically comprising at least 40% by weight of nickel. This point will be explained in detail further on. However, against all expectation, it turns out that alloys according to the present invention that comprise only 30% to 32% by weight of nickel can themselves also hold out durably in a highly corrosive medium, while having a high yield stress, in practice of greater than 800 MPa.

Other features and advantages of the invention will emerge on reading the description given below of particular embodiments of the invention, given by way of indication but non-limitingly, with reference to the appended drawings in which:

BRIED DESCRIPION OF THE DRAWINGS

Figure 2:
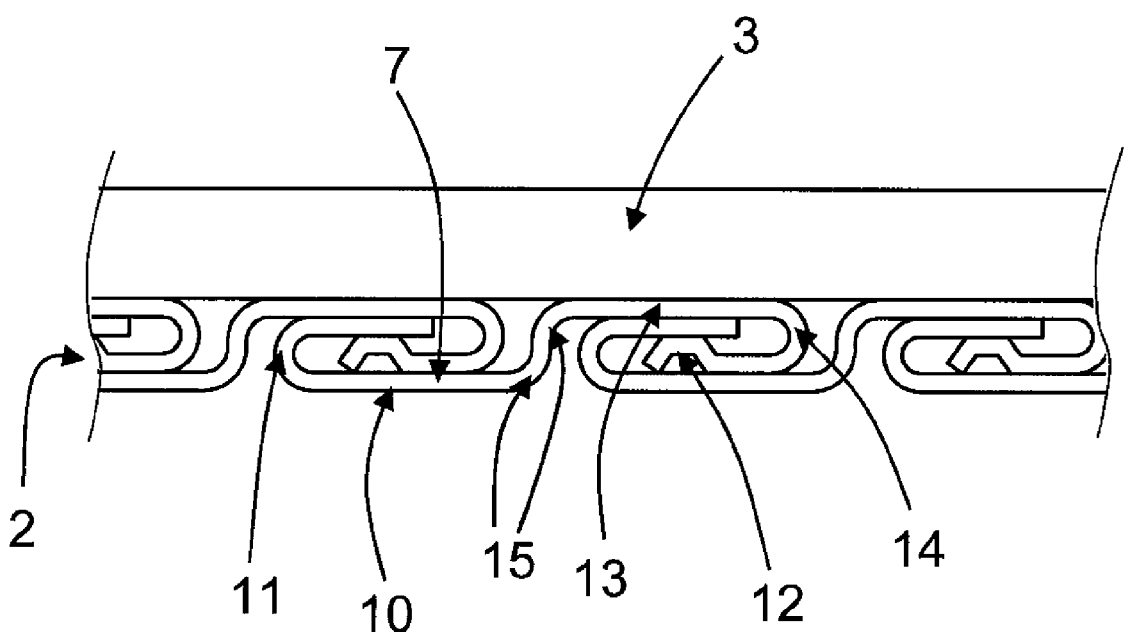

FIG. 1 is a partial schematic view, in perspective, of a flexible tubular pipe according to the invention; and FIG. 2 is a partial schematic view, in axial cross section, of the pipe illustrated in FIG. 1.

DESCRIPTION OF A PREFERRED EMBODIMENT

FIG. 1 illustrates a flexible tubular pipe 1 intended for offshore oil production, and more particularly for transporting oil or gas. It is of the unbonded type and meets the specifications defined in the normative document API 17J. This flexible tubular pipe 1 comprises, from the inside outward, an internal carcass 2, a polymeric sealing sheath 3, a pressure vault 4, tensile armor layers 5 and a polymeric external sheath 6. The polymeric sealing sheath 3 has the role of confining the fluid flowing inside the pipe. In order to be able to withstand the internal pressure, the polymeric sealing sheath 3 is supported by the pressure vault 4 formed from a short-pitch winding of an interlocked metal wire that is intended to take up the radial forces associated with the internal pressure. Around the pressure vault 4, two crossed tensile armor layers 5 are wound in a long pitch and are intended to take up the longitudinal tensile forces undergone by the pipe. The flexible pipe 1 also comprises a polymeric external sheath 6 surrounding and protecting the aforementioned reinforcing layers 4, 5.

The subject of the invention relates to the internal carcass 2, the main role of which layer is to take up the radial forces that tend to collapse the pipe. The internal carcass 2 comprises a reinforcing metal profile 7 wound in a short pitch and the adjacent turns of which are generally interlocked. According to the main embodiment, the internal carcass 2 consists of a simple S-shaped profiled strip, interlocked from turn to turn, as described in document FR2654795 and as illustrated in FIG. 2. In this case, the reinforcing metal profile 7 is precisely this S-shaped profiled strip. According to a second embodiment, described in particular in document FR2772293, the S-shaped profiled strip can be replaced by a wire of drawn and/or rolled form, interlocked from turn to turn, and having a Z-shaped, T-shaped, U-shaped, X-shaped or K-shaped geometry. In this second case, the reinforcing metal profile 7 is precisely this wire of drawn and/or rolled form. According to a third embodiment, especially described in document WO 03/036152, the internal carcass 2 comprises both a profiled strip and a drawn and/or rolled wire, these two components being wound and interlocked together. In this case, this profiled strip and this drawn and/or rolled wire may both be considered to be reinforcing metal profiles of the internal carcass.

According to the present invention, the reinforcing metal profile 7 is made from a corrosion-resistant alloy of the composition described above, and preferably an UNS N08031 alloy. This type of material is especially sold by ThyssenKrupp VDM under the trademark Nicrofer® 3127 hMo.

This alloy typically has the following composition:
30 to 32% by weight of nickel (Ni),
26 to 28% by weight of chromium (Cr),
6 to 7% by weight of molybdenum (Mo),
0.15 to 0.25% by weight of nitrogen (N),
at most 0.015% by weight of carbon (C),
at most 2% by weight of manganese (Mn),
1 to 1.4% by weight of copper (Cu),
at most 0.3% by weight of silicon (Si),
at most 0.02% by weight of phosphorus (P),
at most 0.01% by weight of sulfur (S),
the remainder being iron (Fe) up to 100%.

This alloy lies on the border between, on the one hand, superaustenitic stainless steels, and more precisely superaustenitic stainless steels containing 6% molybdenum, and, on the other hand, nickel-based alloys. It therefore belongs to the list of corrosion-resistant alloys (CRAB) that can be envisaged for applications in a harsh medium. However, the selection of this particular alloy by a person skilled in the art has come up against several difficulties, has required numerous tests, and goes against biases resulting from standards and normative documents.

The first difficulty for making this selection is linked to the large number of grades that can be envisaged. Thus, in the family of duplex steels, a person skilled in the art having to solve the aforementioned problem would have envisaged, besides the 2205 duplex steel (UNS S31803), the superduplex steels containing 25% chromium of the SAF 2507 type (UNS S32750) or even the hyperduplex steels containing 29% chromium, these materials being reputed to combine a high corrosion resistance and very high mechanical properties. To this, it is necessary to add all the superaustenitic stainless steels, which are themselves also renowned for their corrosion resistance. Among these, mention may especially be made of 904L (USN N08904), 254SMo (UNS S31254), 654SMo (UNS S32654) and 4565 (UNS S34565), all four sold by Outokumpu, 25-6Mo (UNS N08925), AL6XN® (UNS N08367) sold by Allegheny and Cronifer® 1925hMo (UNS N08926) sold by ThyssenKrupp VDM. These superaustenitic alloys have a nickel content between 17% and 28% and a chromium content between 19% and 25%. Finally, a person skilled in the art would also have envisaged nickel-based alloys, which are known as being the highest performing materials in highly corrosive media and very particularly Inconel® 625 (UNS N06625), Hastelloy C22® (UNS N06022) sold by Haynes International, Incoloy® 825 (UNS N08825), C-276 (UNS N010276) and Nicrofer®5923hMo (UNS NO6059) sold by ThyssenKrupp VDM. These nickel-based alloys have a nickel content of greater than 40%, which makes them extremely expensive.

The second difficulty is linked to the fact that the reference standard used by a person skilled in the art, namely the NACE MR0175/ISO 15156 standard to which the API RP 17B standard refers in the paragraph "Materials—Unbonded Pipe—Carcass", does not mention the UNS N08031 grade, whereas this same document lists more than one hundred grades of stainless steels, duplex steels, superaustenitic steels and nickel-based alloys (Part 3—Annex D—Tables D1 to D7).

The third difficulty is that the strict application of this standard would have led a person skilled in the art to choose nickel-based alloys, and consequently to eliminate duplex steels and superaustenitic steels. Indeed, the profiling and spiral-winding steps that make it possible to transform a crude strip into an internal carcass are carried out at ambient temperature. Consequently, the strip then undergoes a cold work-hardening which has the beneficial effect of increasing its yield stress, but has the drawback of reducing its corrosion resistance in a medium having a strong concentration of $H_2S$. Indeed, the zones of the material that have been excessively cold work-hardened, and thus greatly hardened, comprise numerous dislocations in which hydrogen will be trapped and give rise to cracks. This is why, in the case of media having a high partial pressure of $H_2S$, the aforementioned NACE standard recommends a maximum hardness that should not be exceeded. It also recommends carrying out, if necessary, an annealing treatment after cold work-hardening in order to return below the recommended hardness thresholds. It turns out that the hardness thresholds are respectively 35 HRc for the superaustenitic steels and 40 HRc for the nickel-based alloys. Furthermore, numerous tests have shown that whatever grade is used, a profiled strip having, after cold work-hardening, an average yield stress of greater than 800 MPa also necessarily has highly work-hardened zones having a hardness of the order of 40 HRc. Consequently, since the solution that consists in annealing the internal carcass has been eliminated for manufacturing complexity and cost reasons, a person skilled in the art would therefore naturally be directed toward nickel-based alloys, which are the only ones to be able to comply with the recommendations of this standard.

FIG. 2 illustrates this phenomenon of heterogeneity of hardness and of work-hardening. It represents, in partial axial cross section, an internal carcass 2 coated on its outer face with a polymeric sealing sheath 3. This carcass comprises a reinforcing metal profile 7 which is, in the present case, an S-shaped profiled strip. The term "strip" is understood to mean a thin and flat section of long length, typically that has a width at least 15 times greater than its thickness. The crude strip is transformed into an S-shaped profiled strip by a machine called a profiler which uses several pairs of shaping rollers to gradually and continuously give the strip the desired geometry. The profiler is generally incorporated directly into a rotating machine known as a spiral winder, so that the profiled strip is directly wound and interlocked in order to form the internal carcass.

The crude strip made of UNS N08031 alloy has, before profiling, a yield stress of the order of 330 MPa and a hardness of less than 20 HRc. Once shaped, the profiled and interlocked strip, seen in longitudinal cross section, has flat parts, especially the parts 10, 13 that have been weakly work-hardened, so that their hardness remains less than 30 HRc. On the other hand, the strip has undergone large deformations in the bending zones of the S, namely the two lateral sides 11, 14 and the central part 15, and also in the zone of the support hook 12. In these greatly work-hardened zones, the local hardness is of the order of 38 to 40 HRc, with a few points at 41 HRc. The average yield stress of the profiled strip, measured parallel to the axis of the latter, is of the order of 840 MPa. Although the UNS N08031 alloy is not cited in the aforementioned NACE standard, the public documents relating to the corrosion resistance of this material specify that its hardness threshold is 35 HRc, that is to say the same as that of superaustenitic steels. This is furthermore consistent with the fact that certain authors consider that UNS N08031 belongs to the category of superaustenitic steels containing 6% molybdenum.

Against all expectation, tests have shown that UNS N08031 withstands highly corrosive media as well as certain substantially more expensive nickel-based alloys. The tests consisted in submerging cleaned and degreased samples of profiled strip in various corrosive media for 30 days, then in examining them in order to find traces of generalized corrosion (reduction in weight) or local corrosion (pitting, cracks, marks). Tests were carried out in a de-aerated medium under the following conditions:

EXAMPLE 1

Temperature: 120° C.
Partial pressure of $H_2S$: 0.9 bar
Partial pressure of $CO_2$: 10.3 bar
Chloride level: 55 000 ppm
pH: 4.3

EXAMPLE 2

Temperature: 94° C.
Partial pressure of $H_2S$: 2.4 bar
Partial pressure of $CO_2$: 5.2 bar
Chloride level: 112 000 ppm
pH: 4.4

The tests showed that the profiled strips made of 2205 duplex steel and made of SAF 25.07 superduplex steel fail these tests. Pitting and SSC (sulfide stress cracking) cracks were observed in the highly work-hardened zones.

As predicted by the normative documents, the nickel-based alloy Nicrofer®5923hMo (UNS N06059) passed these tests perfectly. However, this alloy, which contains around 59% nickel, is extremely expensive. Furthermore, its yield stress, after profiling, is only 700 MPa, compared with 840 MPa obtained with UNS N08031.

Surprisingly, the profiled strip made of UNS N08031 alloy itself also perfectly withstood these tests.

Furthermore, another surprising effect which was demonstrated is that the increase in the yield stress during the profiling is greater for the UNS N08031 alloy than for the related grades. For equal work-hardening, the yield stress of the strip made of UNS N08031 is multiplied by a coefficient of greater than 2.5 whereas under similar transformation conditions, this multiplication coefficient is only of the order of 1.5 for duplex steels, 1.8 for the 316L austenitic stainless steel and 1.8 for the nickel-based alloy UNS N06059. Thus, for example, although the UNS N06059 strip has, in the crude state, a yield stress substantially greater than that of the crude UNS N08031 strip (380 MPa versus 330 MPa), once profiled it has a yield stress substantially below that of the profiled UNS N08031 strip (700 MPa versus 840 MPa). It appears that this technical effect, which is particularly favorable to the UNS N08031 alloy, is linked to the presence of nitrogen.

It can finally be noted that these tests have also confirmed the possibility of manufacturing the internal carcass 2 with other superaustenitic stainless steels that have a nickel content below that of the UNS N08031, in particular UNS N08367 and UNS N08926 which both comprise around 25% nickel, 6% molybdenum and 0.2% nitrogen. However, the corrosion resistance performances of these materials are lower.

The invention claimed is:

1. A flexible tubular pipe for transporting fluids in offshore oil production, said flexible tubular pipe comprising:
   at least one internal carcass, comprising a helically-wound reinforcing profiled metal strip and a polymeric sealing sheath around the carcass, the reinforcing profiled metal strip being cold worked and, in cross-section, including first, bent cold-worked sections and second elongated cold-worked sections each located between two first, bent cold-worked sections, the first, bent cold-worked sections have hardness values above 35 HRc and the second cold-worked sections having hardness values below 30 HRc;
   the reinforcing profiled metal strip is made from a corrosion-resistant alloy comprised of a composition:
   30 to 32% by weight of nickel (Ni),
   26 to 28% by weight of chromium (Cr),
   6 to 7% by weight of molybdenum (Mo),
   0.10 to 0.3% by weight of nitrogen (N),
   at most 0.015% by weight of carbon (C),
   at most 2% by weight of manganese (Mn),
   0.5 to 1.5% by weight of copper (Cu),
   at most 0.5% by weight of impurities,
   the remainder of the composition being constituted of iron (Fe).
   wherein the reinforcing profiled metal strip does not exhibit generalized or local corrosion when submerged for thirty days in a de-aerated medium having at least one of the following combinations of characteristics:
   first combination
   Temperature: 120° C.
   Partial pressure of $H_2S$: 0.9 bar
   Partial pressure of $CO_2$: 10.3 bar
   Chloride level: 55 000 ppm
   pH: 4.3
   second combination:
   Temperature: 94° C.
   Partial pressure of $H_2S$: 2.4 bar
   Partial pressure of $CO_2$: 5.2 bar
   Chloride level: 112 000 ppm
   pH: 4.4.

2. The flexible tubular pipe as claimed in claim 1, wherein the corrosion-resistant alloy is UNS N08031.

3. The flexible tubular pipe as claimed in claim 1, wherein the reinforcing profiled metal strip is a wire of drawn or rolled form.

4. The flexible tubular pipe as claimed in claim 1, wherein the reinforcing profiled metal strip is interlocked.

5. The flexible tubular pipe as claimed in claim 1, wherein the average yield stress of the reinforcing profiled metal strip is greater than 800MPa.

6. The flexible tubular pipe as claimed in claim 1, wherein the first, bent cold-worked sections have hardness values greater than 40 HRc.

7. The flexible tubular pipe as claimed in claim 1, wherein the internal carcass is a profiled stainless steel strip that is wound helically in short pitch into turns that are interlocked with one another.

* * * * *